April 29, 1947.  J. R. LINDSAY  2,419,686
ELECTRICAL CIRCUIT
Filed Aug. 16, 1944
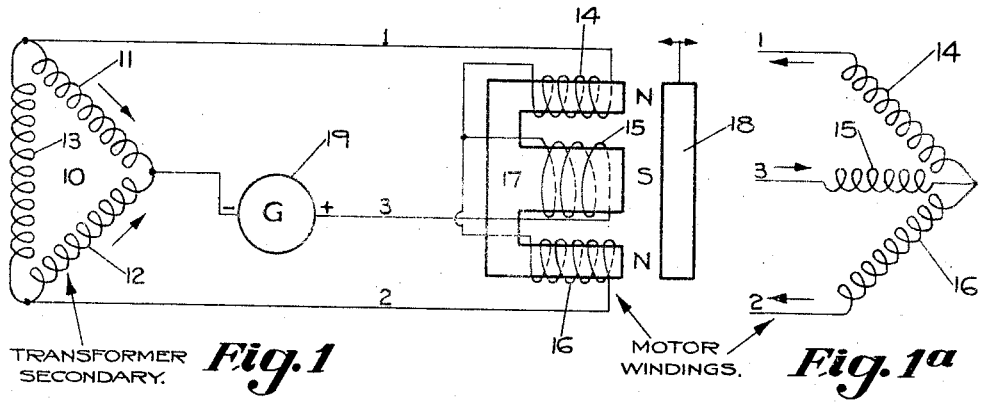
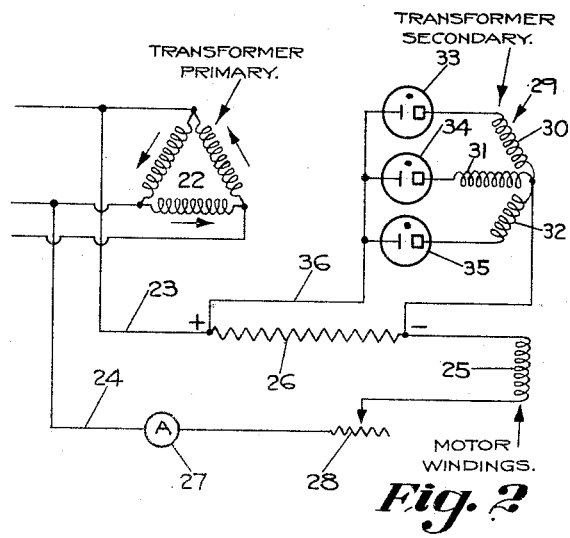
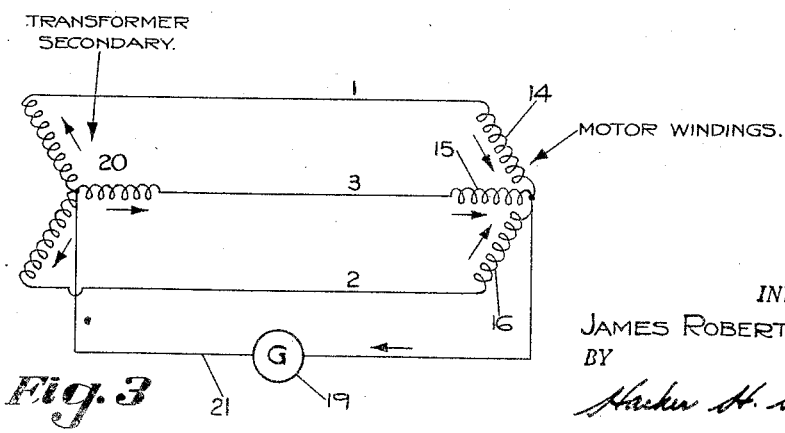
INVENTOR;
JAMES ROBERT LINDSAY,
BY
ATT'Y.

Patented Apr. 29, 1947

2,419,686

UNITED STATES PATENT OFFICE 2,419,686

ELECTRICAL CIRCUIT

James Robert Lindsay, Bexley, Ohio, assignor to The Jeffrey Company, a corporation of Ohio Application August 16, 1944, Serial No. 549,738

3 Claims. (Cl. 172—126)

This invention relates to an electrical circuit, and an object of the invention is to provide an electrical circuit whereby three phase alternating current may be utilized in connection with the energization of a vibratory electro-magnetic motor.

Another object of the invention is to provide an electrical circuit whereby three phase alternating current may be employed to supply a direct current component of mixed current to the winding of an electro-magnetic motor preferably of the vibratory type.

Other objects of the invention will appear hereinafter, the novel features and combinations being set forth in the appended claims.

In connection with vibratory feeders, conveyors, screens, and the like, known commercially as the Jeffrey-Traylor apparatus, one illustration of which is seen in the patent to James A. Flint, No. 2,153,243, for a Vibratory screen, dated April 4, 1939, it is often desirable to utilize three phase current for energy. I have provided electrical systems which make this possible. In one of these systems the principal energy for a vibratory motor of the electro-magnetic device is single phase alternating energy, but to provide what is known in the art as mixed current, which is a direct current superposed on the alternating current, I have provided a novel circuit which makes possible a derivation of this direct current component from a source of three phase alternating current, while providing substantially equal loading of electronic discharge tubes which are employed to convert the alternating current into uni-directional current.

In the accompanying drawings,

Fig. 1 is a wiring diagram of an electrical system employing three phase current to energize the windings of an electro-magnetic motor, the physical or structural relation of the motor, windings, field and armature being illustrated;

In Fig. 1a I have illustrated the motor windings in a manner to suggest the phase relation of the alternating current flowing through;

Fig. 2 of the drawings shows a different electrical circuit energizing a motor winding in which the three phase energy is employed only to develop the direct current component of the mixed current energy; and Fig. 3 shows another circuit in which the motor winding is essentially the same as that of Fig. 1; the transformer secondary being shown connected in star rather than in delta as it is in Fig. 1 of the drawings.

Referring first to Figs. 1 and 1a of the drawings, the transformer secondary of a three phase transformer is indicated generally at 10 and it constitutes three phase windings 11, 12 and 13 connected in delta, the voltages therein being 120 degrees apart. Three phase conductors designated 1, 2 and 3 extend from the secondary winding 10 to three coils 14, 15 and 16 which are wound on the field core 17 of a vibratory electromagnetic motor having a vibratory armature 18. The windings 14, 15 and 16 are so poled as to give relative instantaneous polarities as indicated by the letters NSN in Fig. 1 of the drawings. Since the two outside poles are at the instant north and the center poles south, it is obvious that the flux through the center pole will be split between the two outside, and consequently it has preferably twice the cross-sectional area as suggested diagrammatically in Fig. 1 of the drawings.

Furthermore, as suggested in Fig. 1a of the drawings, the windings 14, 15 and 16 are so connected that the currents in them are 60 degrees out of phase. In other words, winding 15 is reversely connected as compared with what it would normally be in a three phase star connection. Still further, the number of turns on the windings 14, 15 and 16 is selected so that windings 14, 15 and 16 have the same number of D. C. ampere turns. To provide this, windings 14 and 16 have the same number of turns and winding 15 will have essentially half their number of turns.

To provide mixed current operation, conductor 3 has connected therein a source of direct current 19 which is preferably of low voltage as compared with the alternating current voltage. For example, it will be 10 to 20 volts, where the alternating current voltage on a winding 11, 12 or 13, will be 110 volts.

The direct current source 19 may be a battery, a direct current generator, or a rectifier and, for example, may be the rectifier hereinafter described in connection with Fig. 2, which is energized from a three phase source, or it may be a rectifier energized from a single phase source.

The path of the direct current is indicated by the arrows in Figs. 1 and 1ᵃ of the drawings. It is to be particularly noted that all the direct current from the source 19 flows through winding 15, the direct current then splitting, one-half flowing between the winding or coil 14, the other half between the winding or coil 16. Return flow of the direct current also splits between the windings 11 and 12.

As is well known, this mixed current operation provides vibration of the armature 18 at the frequency of the alternating current in the secondary of transformer 10. If straight alternating current operation is desired, the source of direct current 19 is merely omitted and in this case the frequency of vibration of the armature 18 will be twice the frequency of the alternating current.

In Fig. 3 of the drawings I have shown a system in which the transformer secondary 20 is connected in star rather than in delta; the motor windings or coils 14, 15 and 16 being connected the same as before. In this construction, where mixed current operation is desired, the source of direct current 19 is connected between the neutral point of the transformer secondary 20 and the neutral point of the windings or coils 14, 15 and 16 by way of conductor 21.

In Fig. 2 of the drawings I have shown a circuit which has some entirely different features from those contained in Figs. 1 and 1ᵃ, though in each of the circuits at least part of the energy which is delivered to the vibratory motor is derived from a three phase source. In said Fig. 2 three phase conductors are shown connected to a primary winding 22 of a three phase transformer, the primary coils of which are connected in delta. Across two of the three phase conductors leading to said primary winding 22, and thus deriving single phase current therefrom, are conductors 23 and 24 which lead to the terminals of a motor winding or field coil 25, such as that of said Flint Patent No. 2,153,243. Conductor 23 has a resistor 26 connected in series therewith and, as illustrated, conductor 24 has an ammeter 27 and a variable resistor or rheostat 28 connected in series therewith.

To provide an adequate amount of energy for a large vibratory motor where mixed current operation is desired, it has been found desirable to employ a three phase source of alternating current and rectify that current, delivering the rectified current to the terminals of the resistor 26. In other words, it is desirable to employ three electronic discharge tubes to supply the necessary direct current for a mixed current type of vibratory motor.

When first considered, it was thought that this would involve no difficulty and that it would be done simply by taking the three phase windings of a transformer secondary, which are connected in star, and place a gaseous electronic discharge tube in series with each winding to produce a source of relatively smooth direct current. When this was tried in actual operation, however, it was discovered that one of the three tubes carried practically all of the load; the other two carrying practically none.

I have discovered that by reversing one of the windings of the secondary of transformer, the load on all three tubes will be substantially the same. As illustrated in Fig. 2 of the drawings, the transformer secondary 29 has its three windings or coils 30, 31 and 32 connected in star, but winding 31 is reversed from what it would be in a normal star connection; thus their currents are 60 degrees apart. Each of the windings 30, 31 and 32 has an electronic discharge tube, preferably of the gaseous type, connected in series with it, said tubes being indicated at 33, 34 and 35. The cathodes of all the tubes 33, 34 and 35 are connected to a common conductor 36 which leads to one or the positive terminal of the resistor 26, while the neutral point of the windings 30, 31, 32 is connected to the other or negative terminal of the resistor 26.

If desired, other types of rectifiers, such as copper oxide or selenium rectifiers, may be employed instead of the electronic tubes 33, 34 or 35.

In the operation of the system of Fig. 2 transformer secondary 29 and rectifier tubes 33, 34, 35 supply a pulsating direct current to the ballast resistor 26 having a frequency equal to and determined by the frequency of the alternating current energizing primary 22. In other words, this is the direct current component which flows with the alternating current as supplied to conductors 23 and 24 through the motor coil or winding 25. The load on the three tubes 33, 34, 35 is substantially equal and consequently where a relatively high value of direct component is required by the motor winding 25, it can be supplied without overloading any of said tubes. Since this is a mixed current circuit, it is obvious that the frequency of vibration of the vibratory motor with winding 25 will be equal to the frequency of the alternating voltage on lines 23 and 24.

As previously mentioned, a system similar to that provided by transformer secondary 29, tubes 33, 34 and 35, and ballast resistor 26, may be employed as the source of direct current 19 in the systems of Figs. 1 and 3 of the drawings. The operation of the system of Fig. 1 is previously described and that of Fig. 3 is the same, the difference really being in the method of connecting the transformer secondaries 10 and 20 and the consequent different connection of the source of direct current.

There is another difference in the systems of Figs. 1 and 3, however, which requires a different winding of the associated motor coils. That is, in the system of Fig. 1 the direct current in coil 15 splits between coils 14 and 16. Consequently, coil 15 has twice the direct current amperage flow therethrough as compared with coils 14 and 16. In the system of Fig. 3 the direct current flow through the motor windings 14, 15 and 16 is the same since the direct current delivered by source 19 merely splits three ways, as illustrated by the arrows in Fig. 3 of the drawings.

To preserve the desired balance of D. C. ampere turns in the motor winding in the system of Fig. 3, it is evident that each of the coils 14, 15 and 16 will have the same number of turns.

The systems of Figs. 1, 1ᵃ and 2 are disclosed and claimed in my divisional application Serial No. 605,547, filed July 17, 1945.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. An electrical circuit for a vibratory electromagnetic motor including a source of alternating current, means for superposing a pulsating direct current voltage on said circuit having a frequency determined by said source including a three phase transformer having a secondary consisting of three star connected windings each having a rectifier connected in series therewith, one of said phases being reversely connected whereby the current flow through said tubes will be 60 degrees apart.

2. An electrical system including a vibratory electromagnetic motor, a motor circuit, means for energizing said motor circuit with alternating current from one phase of a source of alternating current, means for superposing a pulsating direct current on said alternating current, said pulsating direct current having the same frequency as said alternating current, said means including a three phase transformer having a star connected secondary consisting of three windings with one winding reversely connected whereby its current is 60 degrees out of phase with the other two windings, and means for rectifying the currents from said three windings and superposing it on said motor circuit.

3. An electrical system including a vibratory electromagnetic motor, a motor circuit, means for energizing said motor circuit with alternating current from one phase of a source of alternating current, means for superposing a pulsating direct current on said alternating current, said pulsating direct current having the same frequency as said alternating current, said means including a transformer the secondary windings of which consist of three windings connected in star and energized from a three phase alternating current source with one winding reversely connected whereby its current is 60 degrees out of phase with the other two windings, and means for rectifying the currents from said three windings and superposing it on said motor circuit.

JAMES ROBERT LINDSAY.

REFERENCES CITED

The following references are of record in the file of this patent:

UNITED STATES PATENTS

| Number | Name | Date |
|---|---|---|
| 2,329,122 | Leathers et al. | Sept. 1, 1943 |
| 2,322,754 | Undy | June 29, 1943 |
| 1,854,606 | Winograd | Apr. 19, 1932 |
| 1,433,962 | Meyer | Oct. 31, 1922 |
| 1,647,147 | Roller | Nov. 1, 1927 |
| 2,122,888 | McLeer | July 5, 1938 |

FOREIGN PATENTS

| Number | Country | Date |
|---|---|---|
| 473,402 | German | Mar. 15, 1929 |
| 524,868 | British | Nov. 11, 1939 |